(12) United States Patent
Tanaka et al.

(10) Patent No.: US 9,065,692 B2
(45) Date of Patent: Jun. 23, 2015

(54) INFORMATION NOTIFICATION APPARATUS, METHOD, AND PROGRAM PRODUCT

(71) Applicants: Yasuyuki Tanaka, Chigasaki (JP); Mitsuru Kanda, Tokyo (JP)

(72) Inventors: Yasuyuki Tanaka, Chigasaki (JP); Mitsuru Kanda, Tokyo (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 209 days.

(21) Appl. No.: 13/723,355

(22) Filed: Dec. 21, 2012

(65) Prior Publication Data

US 2013/0227173 A1 Aug. 29, 2013

(30) Foreign Application Priority Data

Feb. 29, 2012 (JP) ................................. 2012-044627

(51) Int. Cl.
*G06F 15/16* (2006.01)
*H04L 29/02* (2006.01)
*H04W 12/06* (2009.01)
*H04L 29/06* (2006.01)
*H04W 12/04* (2009.01)

(52) U.S. Cl.
CPC ............. *H04L 29/02* (2013.01); *H04W 12/06* (2013.01); *H04L 63/062* (2013.01); *H04L 63/0892* (2013.01); *H04W 12/04* (2013.01)

(58) Field of Classification Search
CPC ... H04L 29/02; H04L 63/0892; H04L 63/062; H04L 29/12009; H04W 12/06
See application file for complete search history.

(56) References Cited

U.S. PATENT DOCUMENTS

| | | | |
|---|---|---|---|
| 6,546,391 B1 * | 4/2003 | Tsuruoka | 1/1 |
| 7,475,241 B2 * | 1/2009 | Patel et al. | 713/155 |
| 7,836,489 B2 * | 11/2010 | Kaler et al. | 726/3 |
| 8,605,908 B2 * | 12/2013 | Zhang et al. | 380/278 |
| 8,661,510 B2 * | 2/2014 | Wang et al. | 726/4 |
| 2004/0137888 A1 * | 7/2004 | Ohki | 455/417 |
| 2009/0070582 A1 * | 3/2009 | Aura et al. | 713/168 |
| 2009/0089413 A1 * | 4/2009 | Kamei et al. | 709/223 |
| 2010/0080238 A1 * | 4/2010 | Allan et al. | 370/401 |
| 2012/0254338 A1 * | 10/2012 | Agarwal et al. | 709/208 |

FOREIGN PATENT DOCUMENTS

| | | |
|---|---|---|
| JP | 2009116412 A | 5/2009 |
| JP | 2011-239146 A | 11/2011 |
| WO | 0076247 A1 | 2/2000 |

OTHER PUBLICATIONS

Duffy, et al.; Protocol for Carrying Authentication for Network Access (PANA) Relay Element; Internet Engineering Task Force (IETF); Request for Comments: 6345; Category: Standards Track; ISSN: 2070-1721; Aug. 2011; pp. 1-12.
Office Action dated Dec. 9, 2014 in corresponding Japanese Application No. 2012-044627 with English translation.

* cited by examiner

*Primary Examiner* — Krisna Lim
(74) *Attorney, Agent, or Firm* — Ohlandt, Greeley, Ruggiero & Perle, L.L.P.

(57) ABSTRACT

According to one embodiment, an information notification apparatus includes a table and a notifier. The table is configured to store information about root nodes and information related to the nodes. The notifier is configured to generate, when a communication node is a root node, new information for that root node. The notifier is further configured to read out, when the communication node is not a root node, the information from the table. The notifier is further configured to notify the communication node of the new information or the information read out from the table.

9 Claims, 4 Drawing Sheets

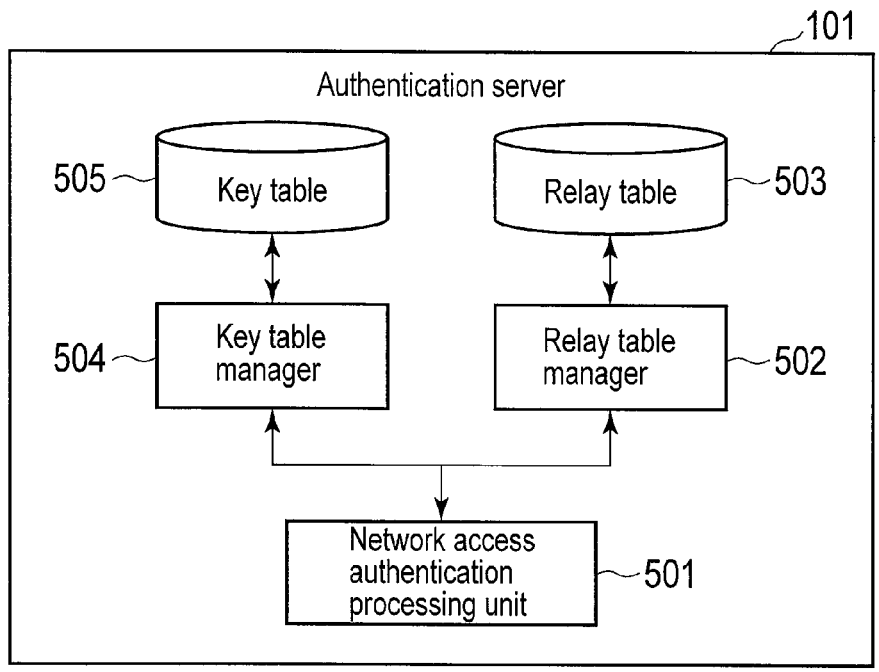
F I G. 5
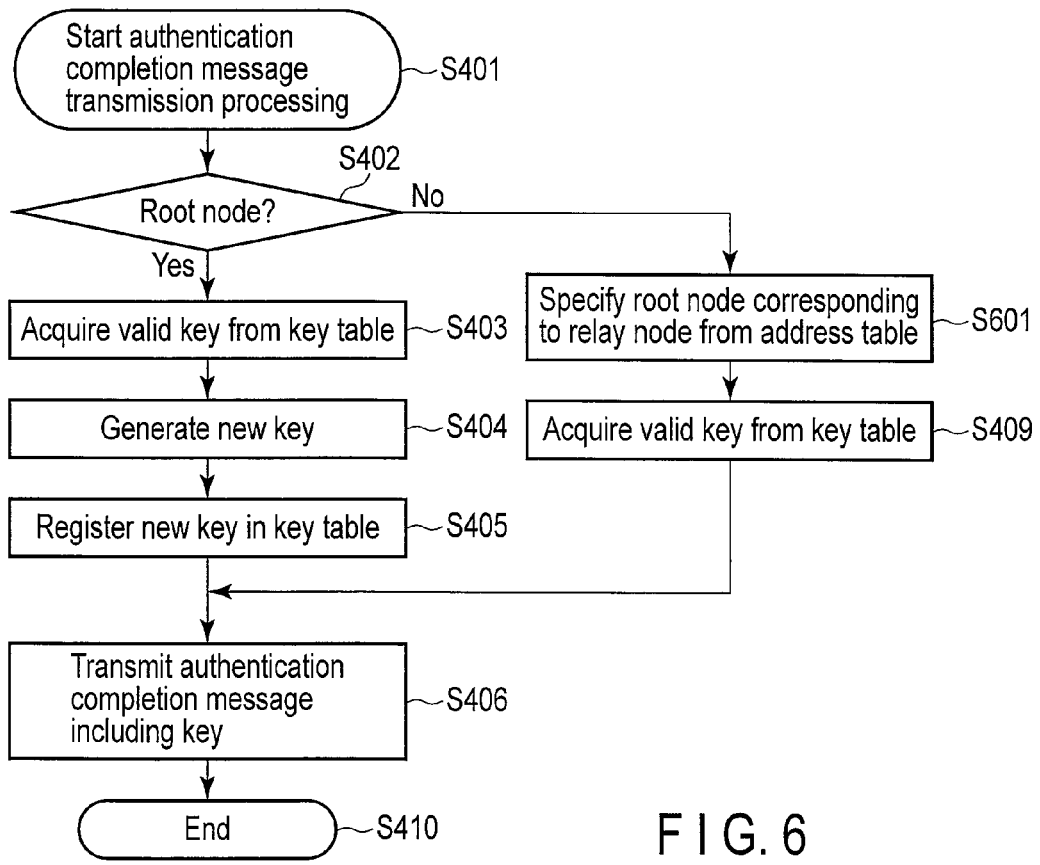
F I G. 6

INFORMATION NOTIFICATION APPARATUS, METHOD, AND PROGRAM PRODUCT

CROSS-REFERENCE TO RELATED APPLICATIONS

This application is based upon and claims the benefit of priority from Japanese Patent Application No. 2012-044627, filed Feb. 29, 2012, the entire contents of which are incorporated herein by reference.

FIELD

Embodiments described herein relate generally to an information notification apparatus, method, and program product, which notify a terminal apparatus that has undergone network access authentication, of information.

BACKGROUND

In network access authentication, a network side authenticates a communication node (terminal apparatus) so as to connect only an authentic communication node to the network. On the other hand, the communication node side authenticates the network so as to be connected to only the authentic network. To the communication node, network access authentication of which has succeeded, a network access authentication server distributes an encryption key used by an application, that used in a link layer, and the like.

RFC6345 specifies the authentication relay specifications which intervene authentication processing between an authentication client and authentication server.

BRIEF DESCRIPTION OF THE DRAWINGS

FIG. 5 is a block diagram showing the arrangement of an authentication server;

FIG. 6 is a flowchart showing the authentication completion message transmission processing sequence according to the second embodiment;

DETAILED DESCRIPTION

In general, according to one embodiment, an information notification apparatus includes a table and a notifier. The table is configured to store information about root nodes and information related to the nodes. The notifier is configured to generate, when a communication node is a root node, new information for that root node. The notifier is further configured to read out, when the communication node is not a root node, the information from the table. The notifier is further configured to notify the communication node of the new information or the information read out from the table.

Embodiments will be described hereinafter with reference to the drawings.

(First Embodiment)

Figure 1:
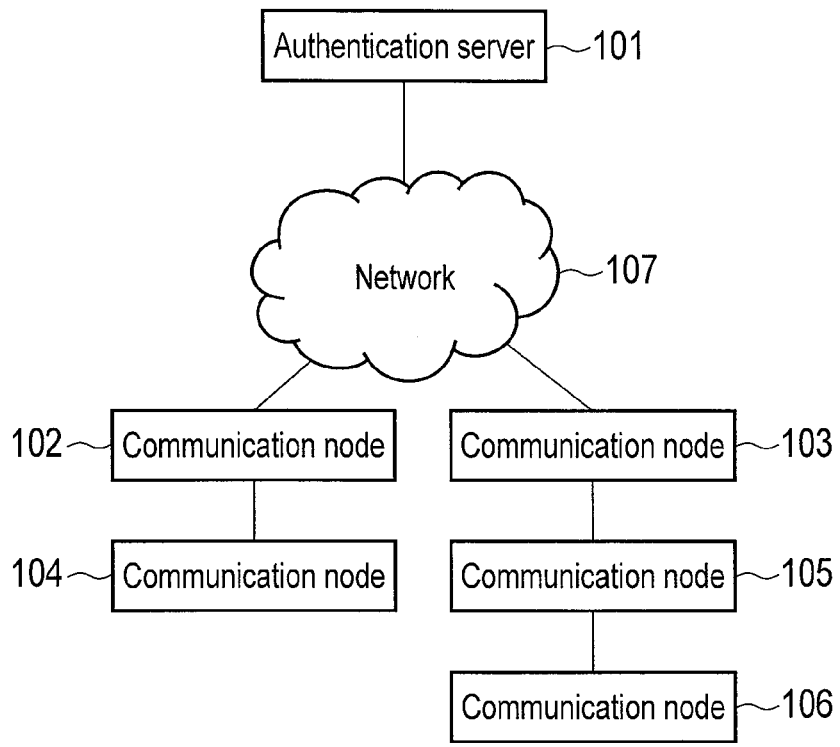
FIG. 1 is a diagram showing the network configuration according to the first embodiment.

An overview of an embodiment will be described below with reference to FIG. 1. A network access authentication server (to be referred to as "authentication server" hereinafter) 101 and communication nodes 102 and 103 are connected to a network 107. A communication node 104 is connected to the network 107 via the communication node 102. A communication node 105 is connected to the network 107 via the communication node 103. A communication node 106 is connected to the network 107 via the communication node 105. To the network 107, communication nodes, which are not shown in FIG. 1, are also connected.

When these communication nodes establish connection to the network 107, network access authentication processing is executed between the authentication server 101 and each communication node. The communication nodes 102 and 103 directly execute network access authentication between themselves and the authentication server 101. The communication node 104 executes network access authentication between itself and the authentication server 101 via the communication node 102. The communication node 105 executes network access authentication between itself and the authentication server 101 via the communication node 103. The communication node 106 executes network access authentication between itself and the authentication server 101 via the communication nodes 105 and 103. In this manner, the communication nodes 104 and the communication nodes 105 and 106 use the communication node or nodes immediately above them as an authentication relay or relays to execute network access authentication between themselves and the authentication server 101.

Each communication node cannot establish connection to the network 107 unless network access authentication succeeds.

Figure 2:
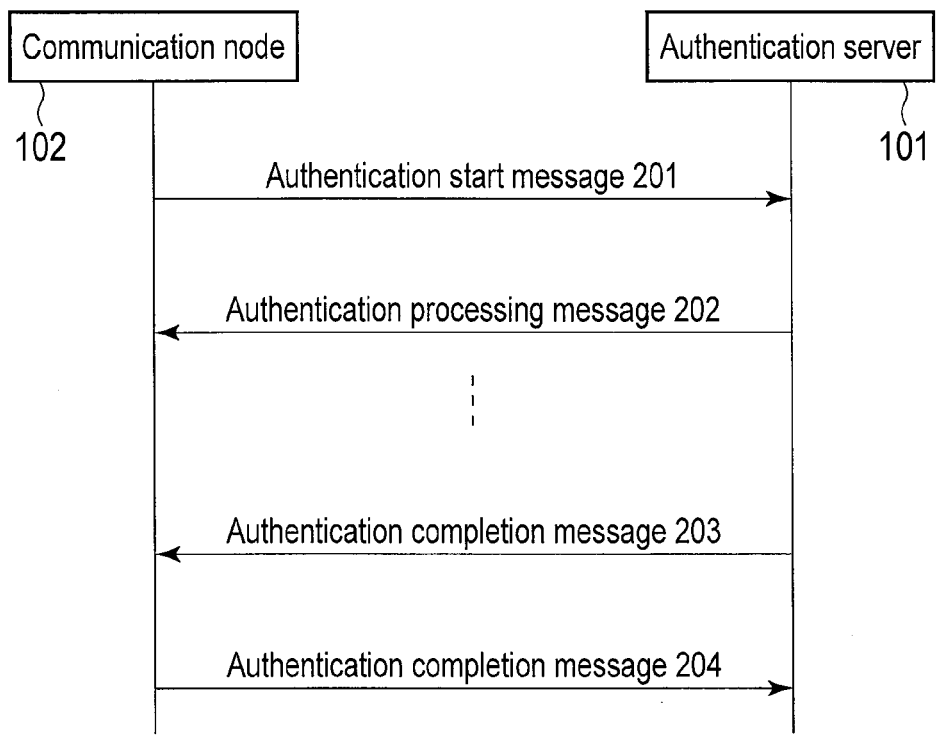
FIG. 2 is a message sequence chart showing one mode of network access authentication.

FIG. 2 shows a message sequence of the network access authentication processing between the authentication server 101 and communication node 102. Initially, the communication node 102 transmits an authentication start message 201 to the authentication server 101, thus starting the network access authentication processing. Upon reception of the authentication start message 201, the authentication server 101 transmits an authentication processing message 202 to the communication node 102. Lastly, authentication completion messages 203 and 204 are exchanged, thus completing the network access authentication processing between the authentication server 101 and communication node 102.

In this way, when the communication node 102 establishes connection to the network 107, it operates as an authentication client. Thus, network access authentication processing between the communication node 102 and authentication server 101 is executed. Note that a network access authentication state has a validity period, and re-authentication processing is often executed before the validity period is expired. At the time of the re-authentication processing, the communication node 102 also operates as an authentication client. In addition, when the communication node 102 makes a communication associated with its own session, it operates as an authentication client.

When the communication node 104 establishes connection to the network 107 via the communication node 102, the network access authentication processing has to be executed between the authentication server 101 and communication node 104, and this authentication has to succeed. At this time, the communication node 102 operates as an authentication relay, and relays messages between the authentication server 101 and communication node 104.

Figure 3:
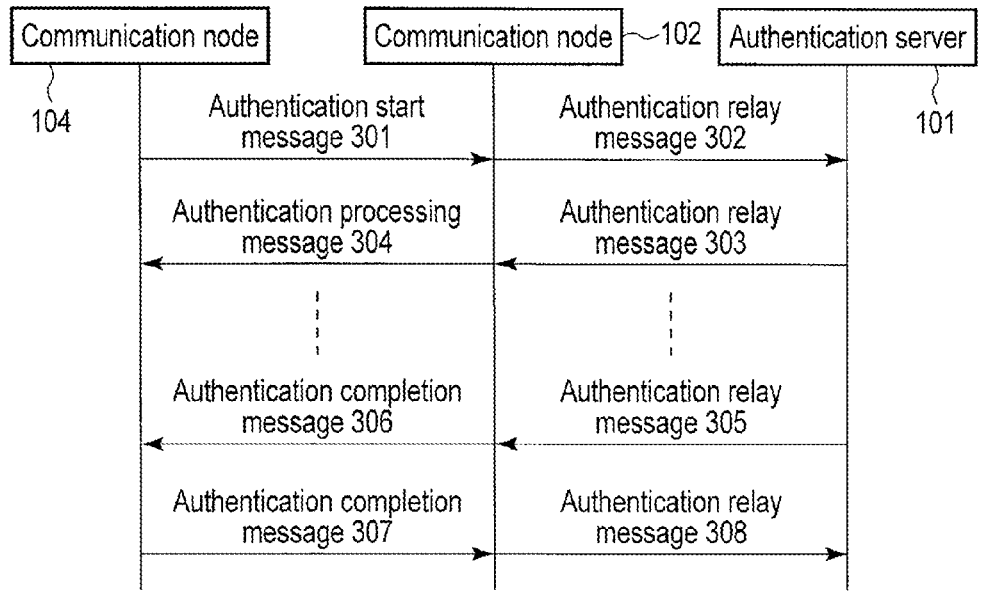
FIG. 3 is a message sequence chart showing another mode of network access authentication.

FIG. 3 shows a message sequence of the network access authentication processing between the authentication server 101 and communication node 104. Initially, the communication node 104 transmits an authentication start message 301 to the communication node 102, thus starting the network access authentication processing. The communication node 102 generates an authentication relay message 302 including the received authentication start message 301, and transmits the generated message 302 to the authentication server 101. Upon reception of the authentication relay message 302, the authentication server 101 extracts the authentication start message 301 from this authentication relay message 302, and transmits an authentication relay message 303 including an authentication processing message 304 to the communication node 102. Upon reception of the authentication relay message 303, the communication node 102 extracts the authentication processing message 304 from the authentication relay message 303, and transmits the authentication processing message 304 to the communication node 104. Lastly, authentication completion messages 306 and 307 are exchanged, thus completing the network access authentication processing between the authentication server 101 and communication node 104. As described above with reference to FIG. 3, the communication node 102 operates as an authentication relay. That is, the communication node 102 transmits messages (301, 307, etc.) from the communication node 104 to the authentication server 101 to the authentication server 101 in place of the communication node 104. The communication nodes 102 also transmits messages (304, 306, etc.) from the authentication server 101 to the communication node 104 to the communication node 104 in place of the authentication server 101.

The authentication completion message transmitted from the authentication server 101 to the communication node 104 includes information according to a topology of the communication node. In this case, each of the communication nodes 102 and 103 is called "root node", and a common key for each topology having each root node as a vertex is notified using the authentication completion message.

For example, the communication node 102 is root node A, and the communication node 103 is root node B. In this case, topology A having root node A as a vertex includes the communication nodes 102 and 104. Topology B having root node B as a vertex includes the communication nodes 103, 105, and 106. The authentication server 101 notifies the communication nodes 102 and 104 of common key A. Also, the authentication server 101 notifies the communication nodes 103, 105, and 106 of common key B.

Note that this embodiment assumes the aforementioned key information as information of which the authentication server 101 notifies the communication nodes using the authentication completion message. However, the information to be notified is not limited to only the key information. For example, various kinds of information such as setting information of each apparatus and an address of an application server can be used as the information to be notified.

Also, the root node need not always be a communication node directly connected to the network 107. For example, the communication nodes 104 and 105 may be used as root nodes.

Figure 4:
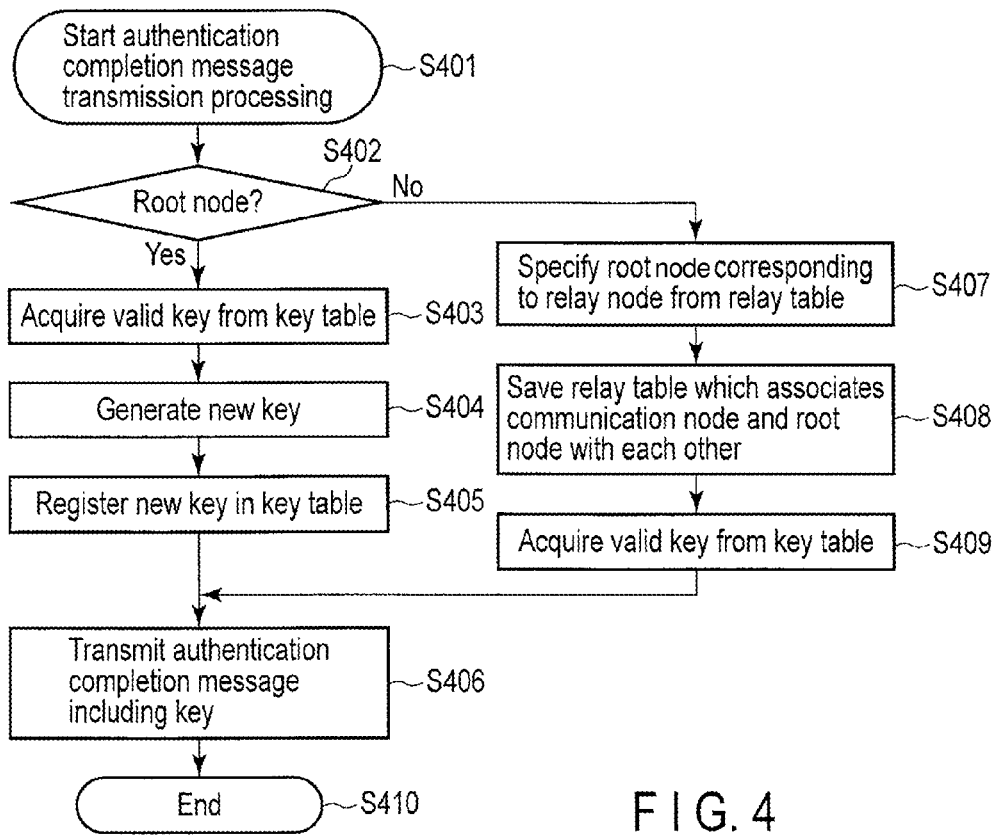
FIG. 4 is a flowchart showing the processing sequence for transmitting an authentication completion message.

FIG. 4 shows the authentication completion message transmission processing sequence by the authentication server 101. When the network access authentication of the communication node has succeeded, the authentication server 101 starts transmission processing of an authentication completion message indicating success of the authentication (S401). The authentication server 101 checks whether or not the communication node is a root node (S402). This checking process can be implemented based on whether or not the network access authentication processing of the communication node has been done using authentication relay messages. When no authentication relay message is used in the authentication of the communication node, that communication node is a root node. Conversely, when authentication relay messages are used in the authentication of the communication node, that communication node is not a root node. When an address of a root node is revealed in advance, whether or not the communication node is a root node can be determined based on the address of the communication node.

If the communication node is a root node, the authentication server 101 acquires a common key to be notified from a key table (S403), and generates a new key (S404). Then, the authentication server 101 registers this new key in the key table (S405), generates an authentication completion message including the key information, and transmits that message to the communication node (S406). Note that the key information to be notified is preferably encrypted in terms of security. In this case, the authentication server 101 preferably encrypts the key information using the network access authentication result.

If the communication node is not a root node, the authentication server 101 specifies a root node on the topology of the communication node from a relay table (S407). For example, the root node of the communication node 104 is the communication node 102, and that of the communication node 106 is the communication node 103. Then, the authentication server 101 registers correspondence relationships between the communication nodes and root nodes in the relay table (S408). Finally, the authentication server 101 acquires a key to be notified to the communication node from the key table based on information of the root node corresponding to the communication node (S409).

FIG. 5 is a block diagram showing the arrangement of the authentication server 101. The authentication server 101 includes a network access authentication processing unit 501, relay table manager 502, relay table 503, key table manager 504, and key table 505. Although not shown in FIG. 5, the authentication server 101 includes hardware components such as a CPU, memory, communication interface, and the like, which are required to operate as an authentication server, and software such as an operating system, communication stack software, and the like.

The network access authentication processing unit 501 receives a message transmitted from the communication node, and executes network access authentication processing.

The relay table manager 502 manages a correspondence relationship between the receiving communication node and root node using the relay table 503. The relay table 503 has information like Table 1 below. More specifically, identification information of each communication node and that of a communication node corresponding to a root node which corresponds to that communication node are stored in the relay table 503. IP addresses of respective nodes may be used as values of communication nodes and root nodes in Table 1. When the authentication server 101 specifies a root node on the topology of the communication node from the relay table (S407), it may specify a root node from an address of a relay node and Table 1 using some bits of an IP address of each node (for example, lower 64 bits in case of an IPv6 address).

TABLE 1

| Communication node | Root node |
|---|---|
| Communication node 102 | Communication node 102 |
| Communication node 103 | Communication node 103 |
| Communication node 104 | Communication node 102 |

The key table manager 504 manages correspondence relationships between the root nodes and keys using the key table 505. The key table 505 has information like Table 2 below. That is, identification of each key and that of a communication node corresponding to a root node which corresponds to the key are stored in the key table 505. Note that the key table 505 also stores a key value corresponding to each key information and its validity period.

TABLE 2

| Key identifier | Root node | Key | validity period |
|---|---|---|---|
| 100 | Communication node 102 | Key100 | Up to 2010 Jan. 20 20:20 |
| 200 | Communication node 102 | Key200 | Up to 2010 Jan. 21 20:20 |
| 220 | Communication node 103 | Key220 | Up to 2010 Jan. 20 18:18 |
| 500 | Communication node 103 | Key500 | Up to 2010 Jan. 21 18:18 |
| 540 | Communication node 102 | Key540 | Up to 2010 Jan. 22 20:20 |

As will be understood by those who are skilled in the art, the aforementioned embodiment can be an embodiment in which a network access authentication protocol is compliant with RFC5191 (PANA), and the operation of the authentication relay is compliant with RFC6345. Note that the protocol and communication method to be applied are not limited to them. The same applies to the second and subsequent embodiments to be described later.

According to the aforementioned embodiment, an authentication server can notify an authentication client of information according to a topology of the authentication client.

Note that when a validity period of (key information of) the network access authentication has expired, and a re-authentication procedure is executed, the information notification processing described in this embodiment may be executed.

(Second Embodiment)

The second embodiment relates to a case in which information of an address range required to specify a root node is given. In the processing sequence for notifying information, steps S407 and S408 in FIG. 4 of the first embodiment are different from those of the second embodiment. Other processes are the same.

FIG. 6 shows the authentication completion message transmission processing sequence of the authentication server 101 according to the second embodiment. In the second embodiment, a root node corresponding to a relay node is specified using an address table which manages an address range used by the root node and communication nodes under that root node (S601).

For example, when an address range used by a root node and communication nodes under that root node is assigned, as shown in Table 3 below, if an address of a relay node is "2001:BD8:2:100:/64", a root node corresponding to that relay node is the communication node 103.

TABLE 3

| Root node | Address range |
|---|---|
| Communication node 102 | 2001:DB8:1::/48 |
| Communication node 103 | 2001:DB8:2::/48 |

As described above, when addresses used by the communication nodes have given rules, and the authentication server 101 can use such rules, information to be notified to the communication node can be specified by the processing sequence shown in FIG. 6. Such second embodiment need not store/manage the relay table unlike in the first embodiment.

(Third Embodiment)

Figure 7:
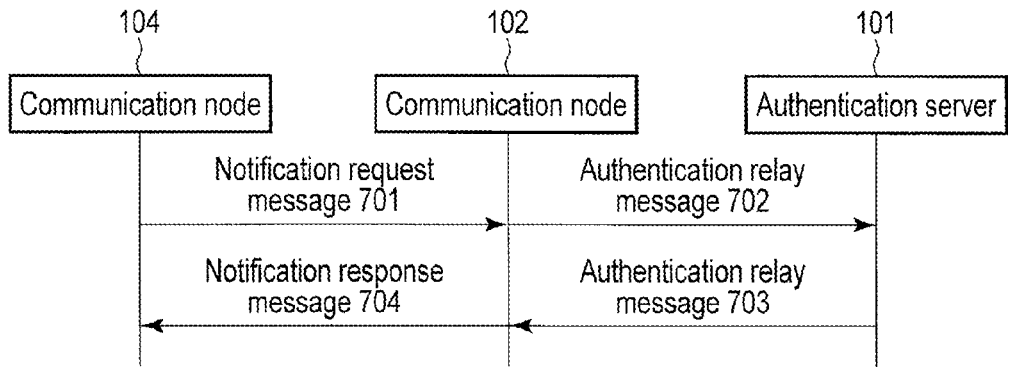
FIG. 7 is a message sequence chart of a notification request.

In the third embodiment, when the communication node 104 transmits a notification request message 701, as shown in FIG. 7, management of the relay table or the like is executed.

When the communication node 104 transmits the notification request message 701 to the communication node 102, the communication node 102 transmits an authentication relay message 702 including the notification request message 701 to the authentication server 101. The authentication server 101 extracts the request message 701 from the authentication relay message 702, and transmits an authentication relay message 703 including a notification response message 704 to the communication node 102. The communication node 102 extracts the notification response message 704 from the authentication relay message 703, and transmits the extracted message to the communication node 104.

Figure 8:
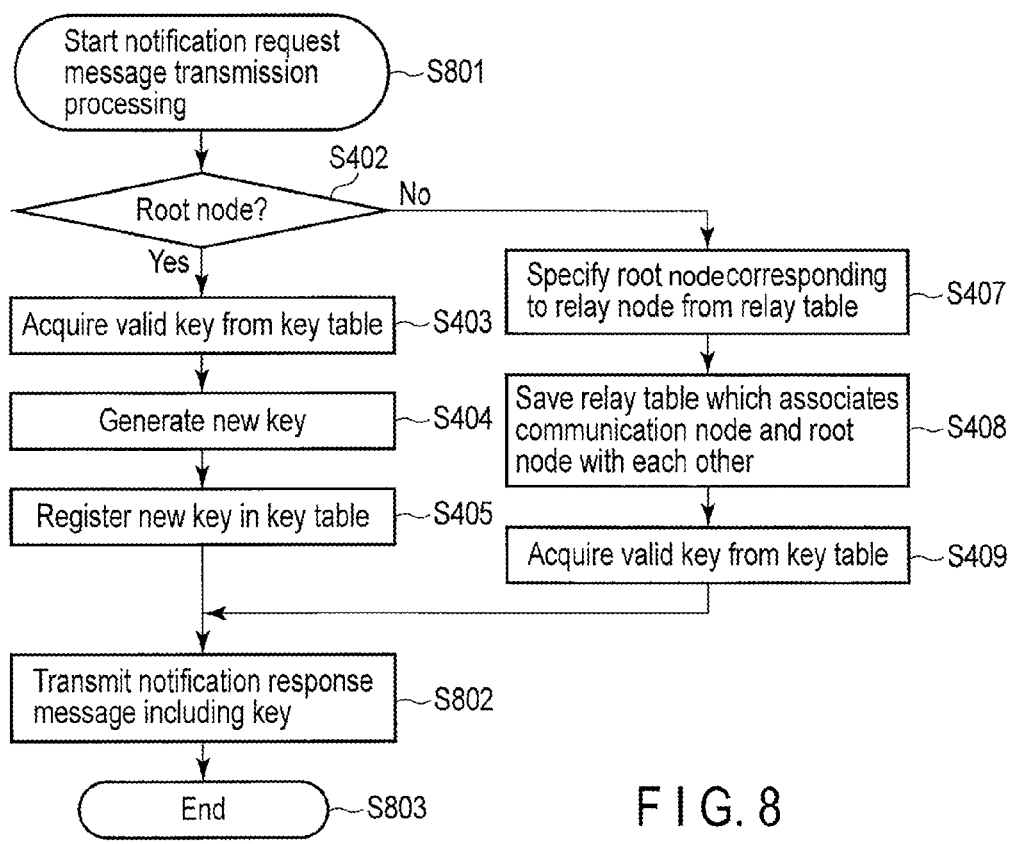
FIG. 8 is a flowchart showing the processing sequence at the time of reception of a notification confirmation message.

The authentication server 101, which received the notification request message 701, executes processing shown in FIG. 8. The processing shown in FIG. 8 is the same as that shown in FIG. 4, except that a key is included in the notification response message 704.

Note that at the time of reception of the notification request message 701, only relay table update processing may be executed while skipping key generation and notification processes. That is, steps S403, S404, 5405, S409, and S802 may be skipped, and only processes (relay table update processes) in steps S407 and S408 may be executed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information notification apparatus comprising:
a table configured to store information related to root nodes;
a processing unit configured
to read out, when a communication node is not a root node, information related to a root node of a communication node from the table, and
to notify the communication node of the information read out from the table; and
a relay table configured to store information indicating a correspondence relationship between communication nodes and the root nodes, wherein the processing unit is further configured to specify the root node of the communication node by referring to the relay table.

2. The apparatus according to claim 1, wherein the processing unit determines whether or not the communication node is a root node based on whether or not network access authentication is executed using an authentication relay message.

3. The apparatus according to claim 1, wherein the processing unit notifies the root node of key information common to a plurality of communication nodes under the root node.

4. The apparatus according to claim 1, the processing unit is further configured to receive a notification request message from a communication node, and to update the relay table by adding the communication node to the relay table according to the notification request message from the communication node.

5. An information notification method comprising:
   storing information related to root nodes in a table;
   controlling a processing unit to read out, when a communication node is not a root node, information related to a root node of the communication node from the table, and to notify the communication node of the information read out from the table;
   storing information indicating a correspondence relationship between communication nodes and the root nodes in a relay table; and
   specifying the root node of the communication node by referring to the relay table.

6. The method according to claim 5, further comprising determining whether or not the communication node is a root node based on whether or not network access authentication is executed using an authentication relay message.

7. The method according to claim 5, further comprising notifying the root node of key information common to a plurality of communication nodes under the root node.

8. The method according to claim 5, further comprising receiving a notification request message from the communication node, and updating the relay table by adding the communication node to the relay table according to the notification request message from the communication node.

9. A non-transitory computer-readable recording medium which stores thereon a program for controlling a computer to function as:
   a table configured to store information related to root nodes;
   a processing unit configured to read out, when a communication node is not a root node, information related to a root node of the communication node from the table, and to notify the communication node of the information read out from the table; and
   a relay table configured to store information indicating a correspondence relationship between communication nodes and the root nodes, wherein the processing unit is further configured to specify the root node of the communication node by referring to the relay table.

* * * * *